United States Patent [19]

Mitra

[11] 4,131,502

[45] Dec. 26, 1978

[54] METHOD OF LAMINATING ADHESIVE TO A PLURALITY OF SPACED FIBER STRIPS

[75] Inventor: Panchanan Mitra, Stapleford, England

[73] Assignee: Ciba-Geigy Corporation, Ardsley, N.Y.

[21] Appl. No.: 845,754

[22] Filed: Oct. 26, 1977

[30] Foreign Application Priority Data

Nov. 6, 1976 [GB] United Kingdom ............. 46267/76

[51] Int. Cl.² .............................................. B32B 5/00
[52] U.S. Cl. .................................. 156/179; 156/234; 156/247; 156/289; 156/296; 156/344
[58] Field of Search ............... 156/176, 178, 179, 296, 156/180, 181, 441, 90, 344, 289, 147, 288, 234, 436, 441, 267, 269, 323, 324, 155; 264/138, 160, 161

[56] References Cited

U.S. PATENT DOCUMENTS

| | | | |
|---|---|---|---|
| 2,954,815 | 10/1960 | Kuts | 156/161 |
| 3,475,264 | 10/1969 | Donaldson | 156/436 |
| 3,660,197 | 2/1972 | Morgan et al. | 156/178 |
| 3,700,511 | 10/1972 | Whitney et al. | 156/181 |
| 3,737,352 | 6/1973 | Auis et al. | 156/180 |
| 3,755,060 | 8/1973 | Bullock | 156/441 |
| 3,783,068 | 1/1974 | Brown | 156/173 |
| 3,784,433 | 1/1974 | Garnish | 156/276 |
| 3,862,287 | 1/1975 | Davies | 156/180 |

FOREIGN PATENT DOCUMENTS 1257482 12/1971 United Kingdom.

*Primary Examiner*—Douglas J. Drummond
*Assistant Examiner*—Michael W. Ball
*Attorney, Agent, or Firm*—Luther A. R. Hall

[57] ABSTRACT

Ribbons of unidirectional fiber-reinforced plastics material are prepared by laying the unidirectional fibers in parallel strips, alternating with strips of another material, onto a plastics material which is on a backing sheet, applying a second backing sheet to the upper surface, which sheet may also be coated with plastics material, applying heat and pressure, and removing one sheet of release material together with the said alternating strips of another material.

The unidirectional ribbons left on the backing sheet are suitable for filament winding operations.

15 Claims, No Drawings

METHOD OF LAMINATING ADHESIVE TO A PLURALITY OF SPACED FIBER STRIPS

BACKGROUND OF THE INVENTION

This invention relates to a method for the production of ribbons, suitable for use in filament winding, from a plastics material in film form and unidirectional fibrous (including filamentary) reinforcing materials, to the ribbons so obtained, and to the filament windings made therefrom.

The process of filament winding is commonly carried out using filaments or ribbons of unidirectional fibre which are impregnated with a solid or semi-solid, but still curable, resin composition. Impregnation of such fibres is usually carried out by immersing bundles of them in a tank of a liquid resin composition followed by evaporation of solvent and/or heating to solidify the resin composition. However, certain fibrous materials, such as carbon fibres, often cannot be satisfactorily impregnated in this way because the amount of resin composition which they pick up depends on the looseness of the bundle of fibres. Since this can vary between different parts of the same tow, pick-up of a controlled amount of liquid resin composition is impracticable. To overcome this difficulty, methods have been devised whereby impregnation is effected using a solid film of a curable resin composition which is applied to one or both sides of the fibres and the resin-fibre "sandwich" is heated under pressure so that the resin composition flows about the fibres to form a prepreg with controlled resin distribution. Such processes are described in British Patent Specification Nos. 1,299,177 and 1,257,482, and also in U.S. Pat. No. 3,660,197.

These methods are perfectly satisfactory when comparatively wide tape is required, but if a thin ribbon is required, such as from a single tow of fibres, the process is often too slow to be of practical use. Attempts have been made to overcome this difficulty by preparing a sheet of composite of normal width and slitting it into thin ribbons, as, for example, described in U.S. Pat. No. 3,700,511. Such a method, however, is not fully satisfactory since it is inevitable that some fibres on the edge of each ribbon are cut, and some materials, particularly aromatic polyamides, are very difficult to slit without causing the cut edges to fray. The advantages obtainable by the use of continuous lengths of reinforcement are thereby lessened.

There is therefore a need for a method of making ribbons of unidirectional fibre-reinforced plastics material in which the amount of plastics material in the ribbon is controlled but in which the ribbons have no cut edges.

We have found that this object may be achieved if a sheet of plastics material is used to impregnate discrete strips of unidirectional fibre having auxiliary strips of another material placed between all of the unidirectional fibre strips on a backing sheet. Removal of the auxiliary strips leaves impregnated unidirectional fibre ribbons on the backing.

DETAILED DISCLOSURE

This invention provides a method of preparing ribbons of unidirectional fibre-reinforced plastics material comprising the steps of i) laying, alternately, unidirectional fibres in a series of discrete parallel strips and a series of auxiliary strips onto a plastics material on a backing comprising a first continuous release sheet, ii) applying to the unidirectional fibres and auxiliary strips a second continuous release sheet, which may be coated on the side which contacts the fibres and auxiliary strips with the same or a different plastics material, iii) applying heat and pressure such that the plastics material or both plastics materials flow about the unidirectional fibres to form a series of coherent ribbons, iv) removing only one (either) of the release sheets, and v) removing the auxiliary strips from between the ribbons of unidirectional fibre-reinforced plastics material with the surplus plastics material adhering thereto.

Steps iv) and v) may be carried out together, if desired.

The unidirectional fibres may be metallic or non-metallic, natural or synthetic. Suitable such materials include steel, cotton, rayon, polyester, silk, jute, boron, and more particularly, carbon, glass, or an aromatic polyamide.

It is essential that the auxiliary strips are either non-fibrous or are of fibres which are stable in their configuration so that they cannot intermingle with the unidirectional fibres and so prevent the formation of a sharp edge to the resultant unidirectional ribbons. Suitable such fibres may be woven, stitched, twisted, or bonded, and include woven tapes made from cotton, nylon or other synthetic fibres, glass continuous fibre rovings which assume tape form during the impregnation process, and vegetable or synthetic fibre string or cord. Suitable non-fibrous auxiliary strips include those of natural or synthetic rubbers of thermoplastics materials which may be flat or of a profile which, on compression, adopts a flat configuration, such as rods or tubes. Rubber or thermoplastics foams in strip form may also be used.

The auxiliary strips serve a dual purpose. First, they allow surplus plastics material from the impregnation of the unidirectional fibres to be removed, thus allowing a controlled amount of plastics material to be impregnated. Secondly, they form a physical barrier to the spreading of the unidirectional fibres, so that unidirectional tapes of predetermined width having parallel edges are formed.

When the auxiliary strips are fibrous or of foam, the plastics material which impregnates the unidirectional fibres also impregnates the auxiliary strips. Removal of the auxiliary strips therefore removes the surplus plastics material from between the impregnated unidirectional tapes. When the auxiliary strips are neither fibrous nor of foam, the surplus plastics material forms a layer on the surface of the strip. To ensure complete removal of this surplus there must be greater adhesion between the plastics material and the auxiliary strips than there is between the plastics material and the backing sheet. Suitable combinations of materials may readily be found by routine testing.

The auxiliary strips preferably have a thickness, when compressed during the impregnation stage, which is the same as that of the impregnated unidirectional fibres, although slightly thicker or thinner material may be used without inconvience.

The plastics material onto which the fibres are laid may be in the form of strips, each strip being wider than the strips of unidirectional fibres which are laid thereon, or, preferably, the plastics material is in the form of a continuous sheet, covering the surface of the release material.

The plastics material or materials may contain a single thermosettable resin, such as an epoxide resin (i.e., a substance containing on average more than one 1,2-epoxide group per molecule) or a resole formed from a phenol such as phenol itself and an aldehyde such as formaldehyde; or it may contain a mixture of thermosettable resins. Thermosetting compositions will further include a curing agent. The plastics material or materials may also consist of, or contain as a mixture with a thermosettable resin, one or more thermoplastics substances which are not heat-curable. Examples of such mixtures are resoles with, as the thermoplastics component, a poly(vinyl acetal) or a nylon; a novolac formed from a phenol such as phenol itself and formaldehyde or other aldehyde, with, as the thermoplastics component, a neoprene rubber or acrylonitrile rubber; and epoxide resins with, as the thermoplastics component, either a phenoxy resin (i.e., a polyarylene polyhydroxy polyether, substantially free from 1,2-epoxide groups, being a copolymer of a dihydric phenol with either a diglycidyl ether of a dihydric phenol or with epichlorohydrin and containing recurring units represented by the formula $-OROCH_2CH(OH)CH_2-$, where R denotes an arylene group) or a copolymer of an $\alpha$-olefin hydrocarbon with an $\alpha$-olefin which is an ester of a carboxylic acid. A polysulphone (a substance containing recurring units represented by the formula $-RSO_2-$, where R has the meaning previously assigned) can be used with or without an epoxide resin. These compositions are, in general, well known, and may be made into resinous films in a conventional manner.

The plastics material may be prepared on a strippable backing of any conventional release material, polyethylene, polypropylene, and (cellulosic) paper treated with a release agent being preferred, as also they are as the second continuous sheet of release material.

The amount of unidirectional fibres laid down to form each strip, and the pressure applied during the impregnation stage, control the final thickness of the ribbons, the width being controlled primarily by the distance between the auxiliary strips. Preferably one to ten tows, each tow comprising 1000 to 20,000 fibres, are laid to form each strip, and preferably a pressure of about 150 to 1000, especially 300 to 600 kPa, is applied to give a final ribbon thickness of between 0.025 to 0.4 mm with a width of 3 to 30 mm. This pressing is usually effected at a temperature of 50° to 180° C, especially 80° to 140° C, but with some plastics materials, particularly high melting thermoplastics, temperatures above 180° C may be required to ensure complete impregnation.

Pressure for the impregnation may be effected in a press but is usually effected by means of rollers which may be resilient, such as those of rubber, or, preferably, they are made of a non-resilient material, especially a metal. If desired, rollers having grooves to fit the contours of the strips on the backing sheet may be used.

The following Examples illustrate the invention. All parts are by weight.

The materials used were as follows:

"Epoxide resin A" denotes a polyglycidyl ether prepared in a known manner from 2,2-bis(4-hydroxyphenyl)propane with epichlorohydrin in the presence of alkali, having an epoxide content in the range 5.0–5.2 equiv./kg and a viscosity at 21° C in the range 20–40 Pa s.

"Polysulphone A" denotes a material available from Union Carbide Corporation under the designation Polysulphone P1700; according to the manufacturer it melted in the range 350 to 360° C, its heat deflection temperature (ASTM Specification D 648) was 175° C, and it contained, per average molecule, 50 to 80 repeating units of the formula

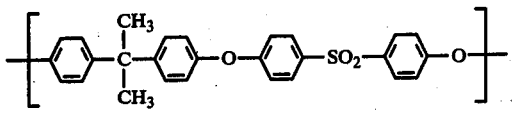

EXAMPLE 1

A mixture of Epoxide resin A (100 parts), Polysulphone A (70 parts), and boron trifluoride-monoethylamine complex (5 parts) was dissolved in methylene chloride (120 parts) and the solution was poured onto a 400 mm wide strip of silicone-coated release paper. The paper was heated in an oven at 70° C to remove the solvent, leaving a film of the resin composition weighing 40 g per square meter.

One such supported film was laid, resin side uppermost, onto a flat surface and groups of three tows of unidirectional aromatic polyamide fibres, viz., a poly(p-phenylene terephthalamide), alternating with strips of woven cotton tape, were laid in parallel lines on top of the resin. Each tow of polyamide fibres comprised approximately 6000 filaments. The cotton tape was 10 mm wide and 0.19 mm thick, and these tapes were laid 17 mm apart.

A second layer of resin-coated release paper was laid on top of the fibres and tapes, and the resultant 'sandwich' was passed through a series of steel rollers where it was heated at 120° C under a pressure of 560 kPa for 1 minute. The tows were thus impregnated with the resin and flattened to a width of 17 mm and a thickness of 0.22 mm. The upper layer of release paper was removed, as were the cotton tapes, which were impregnated with the excess resin and had a final thickness of 0.22 mm. There remained a series of parallel-sided ribbons of resin-impregnated aromatic polyamide fibres on a backing of release material. These ribbons could be removed and used for filament winding when required.

Similar results could be obtained using cotton string in place of the woven cotton tape, and by using unidirectional carbon fibres in place of the unidirectional aromatic polyamide fibres.

EXAMPLE 2

Example 1 was repeated, but in place of three tows of unidirectional aromatic polyamide fibres, single tows of this fibre were laid, alternating with a single tow of glass fibre roving having 2000 filaments per tow.

After impregnation with the resin films the upper layer of release paper and the impregnated glass fibres were removed, leaving a series of parallel-sided ribbons of resin-impregnated aromatic polyamide fibres on a backing of release material. Each ribbon had a width of 7 mm, there being a gap of 6 mm between adjacent ribbons.

What is claimed is:

1. A method of preparing ribbons of unidirectional fiber-reinforced plastics material comprising the steps of
   i) laying, alternately, unidirectional fibers in a series of discrete parallel strips and a series of auxiliary strips onto a plastics material on a backing comprising a first continuous release sheet, wherein the auxiliary strips are different from said unidirectional fiber strips and serve to prevent the spreading of said unidirectional fiber strips and adhere to surplus resin between the unidirectional fiber strips, ii) applying to the unidirectional fibers and auxiliary strips a second continuous release sheet, iii) applying heat and pressure such that the plastics material flows about the unidirectional fibers to form a series of coherent ribbons, iv) removing only one of the release sheets, and v) removing the auxiliary strips from between the ribbons of unidirectional fiber-reinforced plastics material with the surplus plastics material adhering thereto without cutting the backing release sheet to form a release sheet with a plurality of spaced resin impregnated unidirectional fiber strips thereon.

2. The method according to claim 1, in which the second continuous release sheet is coated on the side which contacts the fibers and auxiliary strips with plastics material.

3. The method according to claim 1, in which the plastics material is thermosettable.

4. The method according to claim 1, in which the plastics material is a thermoplastics material.

5. The method according to claim 3, in which the thermosettable plastics material also comprises a thermoplastics material.

6. The method according to claim 3, in which the thermosettable material is an epoxide resin or a resole.

7. The method according to claim 4, in which the thermoplastics material is a polysulfone.

8. The method according to claim 5, in which the plastics material comprises a mixture of
   a resole and a poly(vinyl acetal) or a nylon,
   a novolac and a neoprene rubber or an acrylonitrile rubber, or
   an epoxide resin and a phenoxy resin, or a copolymer of an α-olefin hydrocarbon with an α-olefin which is an ester of a carboxylic acid, or a polysulfone.

9. The method according to claim 1, in which the first and second continuous sheets of release material are of polyethylene, polypropylene, or of paper treated with a release agent.

10. The method according to claim 1, in which the auxiliary strips are woven tapes of cotton or synthetic fiber, continuous glass fiber rovings, or vegetable or synthetic fiber string or cord.

11. The method according to claim 1, in which the auxiliary strips are of natural or synthetic rubber or of thermoplastics materials.

12. The method according to claim 1, in which the unidirectional fibers are of carbon, glass, or an aromatic polyamide.

13. The method according to claim 1, in which each strip of unidirectional fibers comprises one to ten tows, each tow comprising 1000 to 20,000 fibers.

14. The method according to claim 1, in which a pressure of 150 to 1000 kPa is applied to the strips of unidirectional fibers and the auxiliary strips.

15. The method according to claim 1, in which the strips of unidirectional fibers and the auxiliary strips are heated to a temperature of 50° to 180° C.

* * * * *